United States Patent Office 3,009,766
Patented Nov. 21, 1961

3,009,766
DIHALODIMANGANESE OCTACARBONYLS AND PROCESS FOR PRODUCING THE SAME
Vernon R. Sandel, L'Anse, Mich., assignor to Ethyl Corporation, New York, N.Y., a corporation of Delaware
No Drawing. Filed Aug. 11, 1958, Ser. No. 754,152
10 Claims. (Cl. 23—14)

This invention relates to and has as its chief object the provision of new halomanganese carbonyls and processes for their preparation.

Provided by this invention are dihalodimanganese octacarbonyls having the empirical formula $$X_2Mn_2(CO)_8$$

where the X's are halogen atoms. Typical of these compounds are bromochlorodimanganese octacarbonyl, difluorodimanganese octacarbonyl, bromoiododimanganese octacarbonyl, etc. It is preferable that the two halogen atoms be the same and that the halogen have an atomic weight between 35 and 127. In other words, the preferred compounds of this invention are dichlorodimanganese octacarbonyl, dibromodimanganese octacarbonyl and diiododimanganese octacarbonyl.

These novel compounds exist as dimers, and thus can be represented by the formula $$[XMn(CO)_4]_2$$

where X is halogen. They are characterized by being very stable, crystalline substances. They have no sharp melting points and are not readily sublimable. They are soluble in various organic solvents and, therefore, have solubility in hydrocarbons, including gasoline, jet fuel, diesel fuel, burner fuel, lubricating oils, and the like. They are also characterized by being essentially insoluble in water.

The dihalodimanganese octacarbonyls are powerful antiknock agents when dissolved in gasoline even at very low concentrations (e.g., 0.005–0.2 gram of manganese per gallon). This antiknock potency is especially pronounced when these compounds are used in conjunction with organolead antiknock agents, such as tetraethyllead. Thus, very small concentrations of dihalodimanganese octacarbonyls in gasolines containing from about 0.5 to about 10 grams of lead per gallon cause very substantial improvements in the octane quality of the fuel.

The water insolubility of the dihalodimanganese octacarbonyls is a vitally important factor in their utility as antiknocks. Because they are so insoluble in water, their gasoline solutions are not deprived of the valuable manganese content by means of water extraction. Thus, gasolines containing these compounds can be processed, stored, and shipped in the customary manner. Contact with water which is encountered in such customary operations has no adverse leaching effect upon these fuels.

Another tremendously important factor making the present compounds ideally suited as fuel antiknocks is their very great thermal stability. This means that gasoline solutions of dihalodimanganese octacarbonyls can be stored for long periods of time at elevated temperatures (e.g., desert storage) without fear of catastrophic thermal deterioration. This is important because thermal deterioration would not only result in the formation of sludge and loss of valuable antiknock properties, but would result in the liberation of halogen leading to very severe corrosive problems. This would be especially intolerable if such thermal decomposition occurred in gasolines stored over water. In such systems halogen decomposition products are readily hydrolyzed. The resultant halogen acids are known to be severely corrosive of storage tanks, pipelines, and so on. Hence, the very great thermal stability of the compounds of this invention eliminates problems under a wide variety of storage conditions. This thermal stability is also tremendously important in that the dihalodimanganese octacarbonyls decompose at the correct point in the combustion cycle of the spark ignition engines operated on fuels containing these compounds. This means that the compounds can exert their profound antiknock effects under conditions where less thermally stable additives would have already been decomposed.

The beneficial thermal stability properties of the compounds of this invention are also of great value when the compounds are used in conjunction with organolead antiknock agents. Because of their stability, the dihalodimanganese octacarbonyls decompose relatively late in the engine cycle and thereby liberate the halogen in a form that reacts with the decomposition products of the organolead antiknock agent. Formed are relatively volatile lead halides which are removed from the engine via the exhaust gas stream. Hence, the compounds of this invention are not only powerful antiknocks, but possess good scavenging characteristics.

The thermal stability of the dihalodimanganese octacarbonyls is also exceedingly important insofar as their use as chemical intermediates is concerned. These compounds can thus be heated to cause various chemical reactions to take place without inopportune thermal decomposition occurring. Therefore, the fact that dihalodimanganese octacarbonyls have much greater thermal stability than other manganese carbonyl halides makes these compounds of extraordinary value in the chemical and allied arts. The above distinguishing features of the compounds of this invention set them apart from the compounds known heretofore.

There exist a number of ways of preparing the compounds of this invention. One elegant method—a preferred embodiment of this invention—involves the pyrolysis of halomanganese pentacarbonyls. In this thermal reaction, the compounds of this invention are formed in good yield and in high purity. Carbon monoxide is a by-product. The heating can be carried out in the presence or absence of an inert solvent. However, use of a solvent is preferable because of better temperature control. The pyrolysis temperature is generally that which is sufficient to cause the liberation of carbon monoxide from the reaction mixture. Thus, temperatures in the range of 30 to 150° C. can be used, depending upon whether or not a solvent is used; the type of solvent, if used; and the particular halomanganese pentacarbonyl used as the starting material. Generally speaking, higher temperatures should be used when the halomanganese pentacarbonyl is the chloro or bromo compound. Somewhat lower temperatures can be used when heating iodo manganese pentacarbonyl. In most cases, temperatures ranging from about 75 to about 100° C. are preferred as the pyrolysis reaction occurs very readily and smoothly at these temperatures. Solvents which can be effectively used in this process are those which are inert liquids having boiling points above the temperature used to effect pyrolysis. Thus, these solvents include such halogenated hydrocarbons as carbon tetrachlodide; chloroform; methylene chloride; 1,1,1-trichloroethane; dichlorobenzene; bromobenzene; bromoform; etc. Ethers, such as tetrahydrofuran, etc., and hydrocarbons, such as isooctane, decane, xylene, decalin, petroleum ether, mineral oil, etc., can also be used.

Another way of making the compounds of this invention involves pyrolyzing aromatic manganese tricarbonyl halides, such as benzene manganese tricarbonyl bromide, toluene manganese tricarbonyl chloride, mesitylene manganese tricarbonyl iodide, and the like. The reaction conditions for this reaction are generally similar to those described above, except that somewhat higher temperatures are desirable. Thus, the use of a solvent of the type described above is optional, though preferable. The temperatures which are sufficient to cause the liberation of carbon monoxide range from about 80 to about 180° C.

The following specific examples in which all parts and percents are by weight illustrate various aspects of this invention.

*Example I*

A mixture of 5.5 parts of bromomanganese pentacarbonyl (0.02 mole) in 96 parts of carbon tetrachloride was refluxed for approximately 45 minutes. Carbon monoxide was evolved during this time and the mixture became progressively darker. The reaction mixture was then cooled to room temperature and a dark, coppery-colored crystalline material precipitated from the solvent in a 65 percent yield. Chemical analysis showed this product to be dibromodimanganese octacarbonyl. Calculated for $C_8O_8Mn_2Br_2$: carbon, 19.43 percent; manganese, 22.3 percent; bromine, 32.39 percent. Found: carbon, 19.7 percent; manganese, 22.7 percent; bromine, 34.3 percent.

*Example II*

Using essentially the procedure of Example I, dichlorodimanganese octacarbonyl was prepared from chloromanganese pentacarbonyl. During the refluxing of the chloromanganese pentacarbonyl in carbon tetrachloride, gas evolution and darkening of the solution occurred. On cooling to room temperature, orange crystals precipitated. These were filtered off and dried. Infrared spectrum analysis positively identified the product as dichlorodimanganese octacarbonyl.

*Example III*

The procedure of Example I is repeated using 7 parts of iodomanganese pentacarbonyl instead of the bromomanganese pentacarbonyl. A good yield of diiododimanganese octacarbonyl is formed.

The above examples illustrate the preferred process of this invention—viz, pyrolysis of halomanganese pentacarbonyl.

*Example IV*

One part of toluene manganese tricarbonyl iodide was heated to 125° C. in a nitrogen atmosphere. At 97–98° C. the material melted to a deep, red liquid and shortly afterward gave off a small amount of gas (carbon monoxide). At 110° C. the liquid began to reflux. After holding the sample at 125° C. for five minutes, much of it again solidified. Upon cooling, the product was leached with hot isooctane, yielding a red solution from which red-brown crystals precipitated. This was subjected to chemical analysis and found to be diiododimanganese octacarbonyl. It did not melt, but sublimed with decomposition at 110° C. under full pump vacuum (0.01 mm. of mercury). Analysis showed the product to contain 16.4 percent of carbon; 18.3 percent of manganese and 46.3 percent of iodine. Theoretical values: carbon, 16.3 percent; manganese, 18.7 percent; iodine, 43.2 percent.

*Example V*

The procedure of Example IV is repeated with the exception that mesitylene manganese tricarbonyl chloride is used as the starting material. Dichlorodimanganese octacarbonyl is the resultant product.

Use of the dihalodimanganese octacarbonyls as antiknock agents involves dissolving them in appropriate concentration with hydrocarbons of the gasoline boiling range. When used as primary antiknocks, the concentration of manganese as a dihalodimanganese octacarbonyl may range from about 0.002 to about 0.5 gram of manganese per gallon. Higher concentrations may be used to obtain still greater increases in octane quality. In such cases the use of an auxiliary organic solvent promotes more rapid and uniform blending procedures. However, generally speaking, concentrations of dihalodimanganese octacarbonyls equivalent to from about 0.005 to about 0.2 gram of manganese per gallon are preferred. At these concentrations, significant improvements in octane quality are achieved because of the potency of the compounds of this invention in this regard.

It is preferable to use the dihalodimanganese octacarbonyls as antiknocks in conjunction with organolead antiknock agents, such as tetramethyllead, tetraethyllead, tetrabutyllead, methyl triethyllead, tetraoctyllead, dimethyldiethyllead, tetratolyllead, and the like. Such combinations of antiknock agents cause especially great improvements in octane quality, particularly when the amount of the lead antiknock exceeds that of the dihalodimanganese octacarbonyl. Thus, excellent results are achieved in gasolines containing from about 0.5 to about 10 grams of lead per gallon as an organolead antiknock agent and from about 0.005 to about 0.2 gram of manganese per gallon as a dihalodimanganese octacarbonyl. For most purposes, lead concentrations ranging from about 0.5 to about 6.3 grams per gallon are preferable.

In these leaded fuel compositions the dihalodimanganese octacarbonyls also provide scavenging action. These thermally stable compounds decompose late in the engine cycle and not only exert a profound antiknock effect thereby, but liberate their contained halogen. This halogen is in such a form (probably halogen acids) that it readily reacts with decomposition products of the organolead antiknock agent to form lead salts containing halogen. These, in turn, are swept out of the engine and, therefore, pose no operational difficulties.

Demonstrations of the antiknock and scavenging properties of the dihalodimanganese octacarbonyls involve operating gasoline engines on the foregoing fuel compositions. Quantitative measurements of the antiknock potency of the compounds of this invention are obtained by using standard engine rating methods, such as the standard ASTM Motor Method (D–357) or the standard ASTM Research Method (D–908), both of which are described in ASTM Manual of Engine Test Methods, 1956 Edition. Other standard engine test procedures are also described in the literature.

The compounds of this invention are also exceedingly useful as chemical intermediates. For example, they can be used to prepare cyclopentadienyl manganese tricarbonyl compounds among which are the most powerful antiknock compounds known to mankind. The excellent antiknock and supplementary properties of cyclopentadienyl manganese tricarbonyls is set forth in U.S. Patents 2,818,416 and 2,818,417.

The following is a typical method of preparing a cyclopentadienyl manganese tricarbonyl from a dihalodimanganese octacarbonyl: One-tenth of a gram mole of dibromodimanganese octacarbonyl and two-tenths of a gram mole of sodium cyclopentadienide are refluxed in 300 milliliters of tetrahydrofuran for 30 minutes. The reaction mixture is cooled, hydrolyzed and the solvent evaporated by vacuum distillation. Cyclopentadienyl manganese tricarbonyl is sublimed from the residue at 50° C., using full pump vacuum.

The dihalodimanganese octacarbonyl compounds may be incorporated in paints, varnish, printing inks, synthetic resins of the drying oil type, oil enamels, and the like to impart excellent drying characteristics to such compositions. Generally speaking, from 0.01 to 0.05 percent of manganese as a compound of this invention is beneficially employed as a dryer in such a composition.

For example, to a typical varnish composition containing 100 parts ester gum, 173 parts of tung oil, 23 parts of linseed oil and 275 parts of white petroleum naphtha is added 3.0 parts of dichlorodimanganese octacarbonyl. The resulting varnish composition is found to have excellent drying characteristics. Equally good results are obtained when other drying oil compositions and other dihalodimanganese octacarbonyl compounds of this invention are used.

The compounds of this invention are also very useful additives to such petroleum hydrocarbon products as jet fuels, diesel fuels, burner fuels, and lubricating oils. A multitude of beneficial functions are served when the compounds of this invention are so used. For example, the presence of dihalodimanganese octacarbonyls in jet fuels, diesel fuels, and burner fuels results in the elimination or substantial reduction of sooty deposits and smoke. Concentrations of manganese ranging from 0.001 to about 0.5 gram per gallon are useful in this regard. When used at similar concentrations in crankcase lubricating oils, supplemental antiknock effects are achieved.

Other important uses of the dihalodimanganese octacarbonyls of this invention include their use as chemical intermediates in the preparation of metal and metalloid-containing polymeric materials. In addition, these compounds can be used in the manufacture of medicinals and other therapeutic materials, as well as agricultural chemicals, such as fungicides, defoliants, growth regulants, and so on.

The starting materials used in the preparation of the dihalodimanganese octacarbonyls can be prepared in high yield. An elegant way of making halomanganese pentacarbonyls involves reacting free halogen with dimanganese decacarbonyl in an inert, liquid-organic solvent, such as carbon disulfide. Temperatures ranging from about 0 to about 100° C. can be used. An excellent way of preparing aromatic manganese tricarbonyl halides, such as mesitylene manganese tricarbonyl iodide, toluene manganese tricarbonyl iodide, benzene manganese tricarbonyl iodide, toluene manganese tricarbonyl chloride, ethylbenzene manganese tricarbonyl fluoride, biphenyl manganese tricarbonyl bromide, etc., involves reacting an aromatic hydrocarbon compound with a manganese pentacarbonyl compound in the presence of a Friedel-Crafts catalyst. Temperatures of 20 to 300° C. preferably 50 to 200° C. are used. To illustrate, 2 parts of bromomanganese pentacarbonyl, 2 parts of aluminum chloride and 30 parts of mesitylene are refluxed (at about 165° C.) under nitrogen. The mixture is then hydrolyzed with 20 parts of water, resulting in a pale yellow water layer. Upon saturating this solution with postassium iodide, ivory-colored crystals of mesitylene manganese tricarbonyl iodide are precipitated. This general procedure is applicable to the preparation of aromatic manganese tricarbonyl halides of the formula $$AMn(CO)_3X$$

where A is an aromatic compound coordinated with the manganese atom and X is a halogen.

What is claimed is:
1. Dihalodimanganese octacarbonyls selected from the group consisting of dichlorodimanganese octacarbonyl and dibromodimanganese octacarbonyl.
2. Dichlorodimanganese octacarbonyl.
3. Dibromodimanganese octacarbonyl.
4. Process comprising pyrolyzing a compound selected from the group consisting of chloromanganese pentacarbonyl, and bromomanganese pentacarbonyl at a temperature at which carbon monoxide is evolved.
5. Process for preparing dichlorodimanganese octacarbonyl which process comprises pyrolyzing chloromanganese pentacarbonyl at a temperature at which carbon monoxide is evolved.
6. Process for preparing dibromodimanganese octacarbonyl which process comprises pyrolyzing bromomanganese pentacarbonyl at a temperature at which carbon monoxide is evolved.
7. The process of claim 6 wherein the pyrolysis is carried out in the presence of an inert solvent having a boiling point which is higher than the pyrolysis temperature.
8. The process of claim 7 wherein the pyrolysis temperature ranges from about 75 to about 100° C.
9. The process of claim 5 wherein the pyrolysis is carried out in the presence of an inert solvent having a boiling point which is higher than the pyrolysis temperature.
10. The process of claim 9 wherein the pyrolysis temperature ranges from about 75 to about 100° C.

References Cited in the file of this patent

E. O. Brimm et al.: Journal of the American Chemical Society, vol. 76, 1954, pages 3831–3835.